United States Patent [19]

Dluhosch et al.

[11] Patent Number: 4,734,693

[45] Date of Patent: Mar. 29, 1988

[54] SWITCH LOCK INSTALLATION

[75] Inventors: Joachim Dluhosch, Schweinfurt; Hans Fliege, Obertheres; Dieter Lutz, Schweinfurt; Franz Nagler, Gädheim/Ottendorf; Horst Oppitz; Christoph Thielen, both of Dittelbrunn; Wolfgang Thieler, Hassfurt-Uchenhofen, all of Fed. Rep. of Germany

[73] Assignee: Sachs-Systemtechnik GmbH, Fed. Rep. of Germany

[21] Appl. No.: 756,759

[22] Filed: Jul. 18, 1985

[30] Foreign Application Priority Data

Jul. 18, 1984 [DE] Fed. Rep. of Germany ....... 3426508

[51] Int. Cl.[4] .......................... G06F 7/04; G06K 7/01; E05B 49/00

[52] U.S. Cl. ............................ 340/825.31; 235/382.5; 361/172; 70/271; 70/278

[58] Field of Search ....................... 340/825.31, 825.32, 340/825.34; 361/172; 70/271, 278, 263; 235/382.5

[56] References Cited

U.S. PATENT DOCUMENTS 3,919,869 11/1975 Fromm .................................. 70/263

4,144,523 3/1979 Kaplit ............................ 340/825.31

4,274,080 6/1981 Brunken ........................... 235/382.5

4,280,118 7/1981 Brunken et al. ................. 235/382.5

*Primary Examiner*—Ulysses Weldon

*Assistant Examiner*—Ralph E. Smith

*Attorney, Agent, or Firm*—Toren, McGeady & Associates

[57] ABSTRACT

For controlling a central locking installation and/or theft alarm of a motor vehicle a switch lock installation is provided which comprises at least one lock with mechanical tumblers for the mechanical locking and unlocking of a door or a bonnet of the motor vehicle. The tumblers form a first key secret. The key which blocks the tumblers carries an electrically, magnetically or optically readable information carrier for a second, operationally variable key secret. A reading device detects the information of the second key secret in a position in which the mechanical tumblers of the lock are released. If the key is moved in the opening direction of the lock, a control circuit compares the information read by the reading device with an ideal information stored in a memory circuit and controls the central locking installation and/or theft alarm accordingly. If the key is moved in the closure direction of the lock, then the information of the second key secret read by the reading device is taken as new ideal information into the memory circuit.

11 Claims, 17 Drawing Figures

SWITCH LOCK INSTALLATION

BACKGROUND OF THE INVENTION

The invention relates to a switch lock installation and particularly a switch lock installation for controlling a central locking installation and/or a theft alarm, preferably in a motor vehicle.

STATEMENT OF PRIOR ART

From U.S. Pat. No. 3,919,869 a switch lock installation is known the lock of which is a conventional cylinder lock with mechanical tumblers. The cylinder lock is locked by means of a flat key, the bit of which corresponds to the closure secret of the tumblers. The back of the flat key shank carries a magnetic track with a magnetically coded second closure or key secret information which is read by a magnetic field sensor in the insertion of the key into the lock. A control circuit compares the read information with a given ideal information stored in a memory circuit and in the case of conformity of the information data delivers a control signal which through an electromagnet releases a bolt movable manually by means of a door handle. On insertion of the key into the lock or on actuation of the lock by means of the key a switch fitted on the lock is actuated which switches on the supply voltage of the control circuit. In this known switch lock installation the information stored on the magnetic track of the key shank back cannot be altered in operation by the user of the switch lock installation.

From U.S. Pat. No. 4,280,118 a switch lock a flat magnetic key is known the key secret or locking code information of which, formed exclusively by permanent magnets, is read by magnetic field sensors of a reading device and compared by a comparator circuit with the ideal information stored in a memory. The magnets of the key are held on the key so as to be displaceable in operation so that they can be moved by the user according to choice into predetermined pattern positions detectable by the magnetic field sensors, or out of these positions. The key secret of the magnetic key is thus adjustable. The memory is connected with the reading apparatus and is cleared by means of a switch for the reading in of the locking code information set on the key. Thus transmission errors of the key secret set on the key can be avoided. When the switch lock installation known from U.S. Pat. No. 4,280,118 is used for the control of a central locking installation of a motor vehicle, an additional lock actuatable mechanically by means of a further key is necessary so that the motor vehicle may be opened and closed in the cas of a defect in the switch lock installation.

OBJECT OF THE INVENTION

The invention is directed towards providing an operationally reliable, simple, switch lock installation, particularly for the control of the central locking installation and/or a theft alarm, preferably of a motor vehicle, in which the key secret information can be altered in operation by the user, where it is to be ensured that the lock can be locked or unlocked independently of the operational readiness of the controlled installation, as for example the central locking installation or theft alarm and the associated control circuits, and the alteration of the key secret information takes place exclusively on the key and no further manual control measures are necessary on the lock. The switch lock installation is here to be universally usable so that it can also be used for the control of locking installations or theft alarm installations in a house.

SUMMARY OF THE INVENTION

The invention is based upon a conventional lock, particularly a cylinder lock, which is lockable by means of mechanical tumblers, in which the tumblers provide for a first key secret information. The key, preferably formed as flat key, in addition to the recesses and protuberances controlling the tumblers of the lock carries an information carrier for a second key secret information which can be read by a reading device of the lock electrically, magnetically or optically. The key secret information of the information carrier is manually variable and controls the function of the central locking installation and/or the theft alarm in dependence upon whether it conforms or does not conform with ideal information data stored in a memory circuit. Independently of that the lock, which is preferably a door lock or a bonnet lock of the motor vehicle, is actuatable manually by means of the key so that even in the case of failure of the electronic circuits it can be locked or unlocked. Likewise the ignition lock can be actuated mechanically as before.

The information carrier comprises at least one information carrier element which is adjustable manually in relation to the shank of the key or manually replaceable, by means of which the second key secret information data can be varied by the user. The second key secret information data set on the key is written each time afresh into the memory circuit when the lock is moved by means of the key in the locking direction, that is the door or the bonnet of the motor vehicle is locked. The write-in operation of the memory circuit is controlled automatically by a switch coupled with the lock. Since the closure movement of the lock presumes a key with correct first key secret information data the second key secret information data cannot be altered by unauthorized persons by manipulation of the electronic circuits by other magnetically coded keys or the like. The switch is actuatable preferably in the closure end position of the lock and can be utilized in addition fo the controlling of the central locking installation and/or the theft alarm. If desired a further switch, actuatable in the opening direction, can be provided for the controlling of these installations. Both switches can be utilized to switch on the supply voltage of the reading device and/or of the control circuit.

The switch lock installation can be utilized with special advantage for the control of additional functions, particularly of the motor vehicle. For this purpose a gate circuit is associated with at least one of several locks, particularly the ignition lock, and in dependence upon the control signal of the control circuit and the actuation of the associated lock triggers the additional function. These additional functions are preferably person-related functions, as for example a person-related adjustment of the driver's seat or the external mirror of the vehicle by servo-drives in accordance with previously programmed and stored ideal positions. The control circuit can here respond to several of the second key secret information data which then can be differently programmed personally by different key owners. The second key secret information data can differ also only in a part of their information.

A further aspect of the invention, which can be utilized in switch lock installations other than those at present under discussion, provided the switch lock installations require a lock operable mechanically by tumblers and a variable, electrically, magnetically or optically readable key secret information data, concerns the configuration of the key. The key should be as small and convenient as possible and is therefore formed as a flat key and has a handle piece and a shank protruding from the handle piece in the direction of the plane thereof and provided with recesses and/or protuberances for the actuation of tumblers of the lock which is preferably formed as cylinder lock. In a key of this kind the information carrier on which the second key secret information can be adjusted manually is arrange.d in the region of the transition from the shank into the handle piece. In this way the appearance of the key is only inappreciably altered, so that the key hardly differs from conventional keys. More particularly the key can be utilized for the accommodation of a part of the information carrier or of an associated detent mechanism for the step-by-step adjustment of the information carrier.

In a preferred embodiment in which the second key secret information data are read optically, the key carries several code segments of opaque material guided for displacement substantially in the direction of the plane of the handled piece preferably transversely of the longitudinal direction of the shank in relation to on another and parallel between two end positions. In the lock to each of the code segments there is allocated a light barrier which in one of its two end positions is interrupted by the code segment and in the other end position is cleared. In order to prevent unintentional shifting of the code segments these are provided with detent elements for their two end positions. The light barriers, which may have a common light source, are arranged preferably in the cylinder of the cylinder lock.

In another preferred embodiment the second key secret information is present in magnetic form and is read with magnetic field sensors. The information carrier comprises at least one disc extending substantially in the direction of the plane of the handle piece and mounted on the key rotatably about an axis extending transversely of the plane of the disc. The disc carries at least one permanent magnet the position of which changes on rotation of the disc in relation to the magnetic field sensors of the reading device, so that the key secret can be varied.

The disc can carry a plurality of magnets offset in relation to one another in the circumferential direction in a predetermined angle pattern, which provides a code pattern in relation to the pattern arrangement of the magnetic field sensors. Thus in every angle position of the disc the reading device reads a code differing from the other positions. Discs having eight pattern positions staggered at equal intervals, which can be read in a code of three-out-of-eight in the case of four magnets held on the disc are particularly suitable. Smaller discs are obtained in the case of four angle pattern positions, two magnets and two magnetic field sensors per disc, which permit the exploration of a two-out-of-four code.

A disc is preferably arranged on each of the two sides of the shank and their circumferences overlap the handle piece.

In the embodiments as explained above the magnets are arranged in a code pattern so that the magnetic field sensors can be formed as Hall switches which supply signals in binary code. The number of magnets and magnetic field sensors can be reduced if analog magnetic field sensors are utilized, particularly Hall elements. The magnetic field sensors are arranged with spacing from one another in the direction of displacement of the magnet and supply analog signals corresponding to the field intensity. The ratio of the signals or their difference is a measure for the position of the magnet in relation to the two magnetic field sensors and forms the second, variable key secret information data. The magnet can be seated on one of the above explained discs and particularly can be displaceable transversely of the longitudinal direction of the key shank. On the other hand the magnet can also be held on a carrier part which is guided on the shank or the handle displaceably in the longitudinal direction of the shank. The carrier part is preferably a threaded rod which is fixed axially after the style of a spindle drive in a nut retained on the handle. By rotation of the nut the position of the magnet can be varied in the longitudinal direction of the shank, and thus the key secret can be altered.

The analog output signal of the magnetic field sensors is expediently converted into digital form by means of an analog-digital converter for the comparison with the ideal information and for storage in the memory circuit. In the memory circuit the signals of the two magnetic field sensors can be stored each separately. To reduce the storage space requirement, however, the difference of the two analog signals will preferably be digitalized and stored.

A further version of a flat key for a cylinder lock locked by mechanical tumblers, which is likewise also usable in control lock installations other than those explained initially, comprises as information carrier a carrier body held on the handle piece and/or the shank for replacement in operation. The carrier body holds several permanent magnets arranged in a predetermined pattern which are explored by magnetic field sensors of the reading device of the lock. The carrier body preferably has at least one plane of symmetry in relation to the pattern of the magnets and is reversibly securable to the key. In this way several key secret information data can be formed with one and the same carrier body, according to the position in which the carrier body is arranged in relation to the magnetic field sensors of the reading device. Alternatively the carrier body can have the section openings at the pattern positions for permanent magnets which are replaceable operationally, so that even with a constant securing position of the carrier body several code patterns can be generated. The carrier body is preferably a flat strip extending i the longitudinal direction of the key shank.

In all embodiments of the key in which permanent magnets are read by magnetic field sensors, particularly Hall switches, which respond to different polarities of the magnets, by selection of the polarity of the magnets it is possible to extend the number of cod possibilities. More particularly the polarity of the magnets can be used for the coding of personal key secret information and for the controlling of person-related functions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
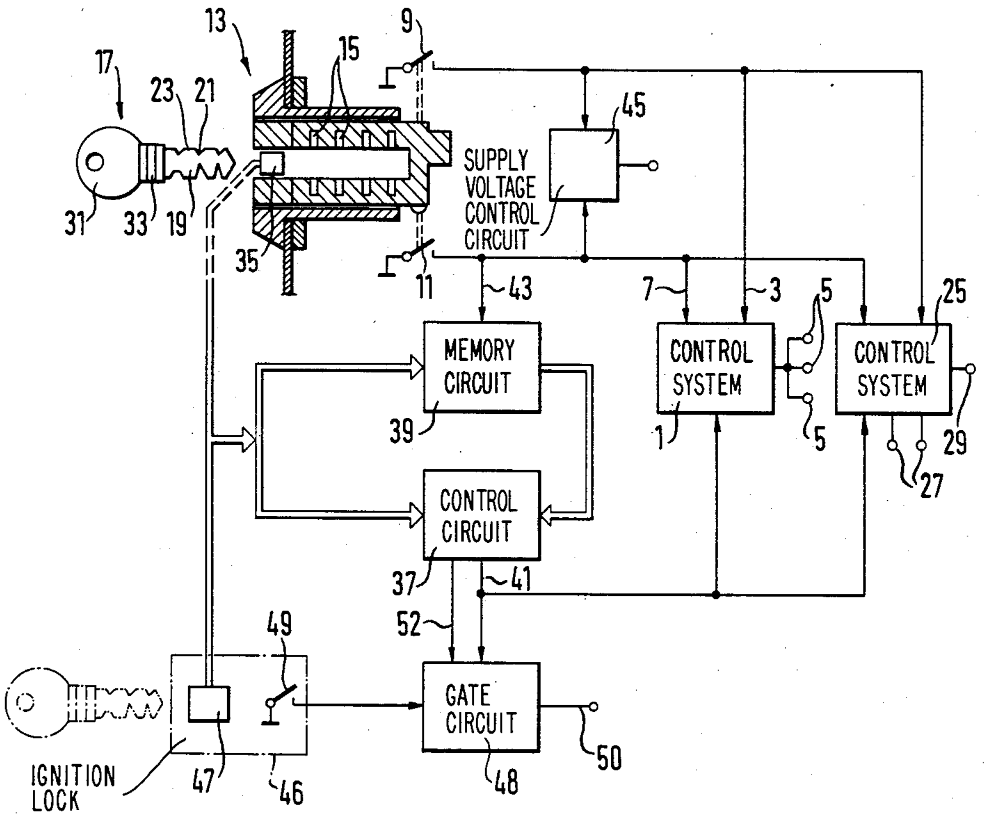
FIG. 1 shows a diagrammatic block circuit diagram of a combined central locking and theft alarm installation of a motor vehicle.
Figure 2:
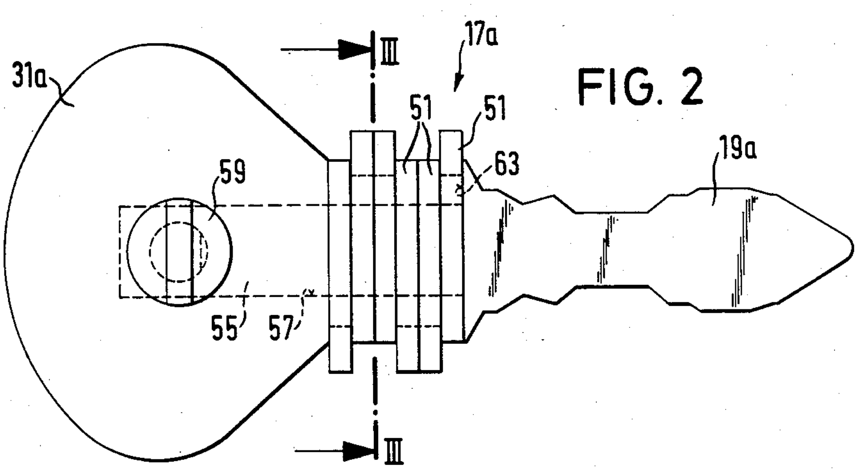
FIG. 2 shows a lateral elevation of an optically explorable key for use in an installation according to FIG. 1.
Figure 4:
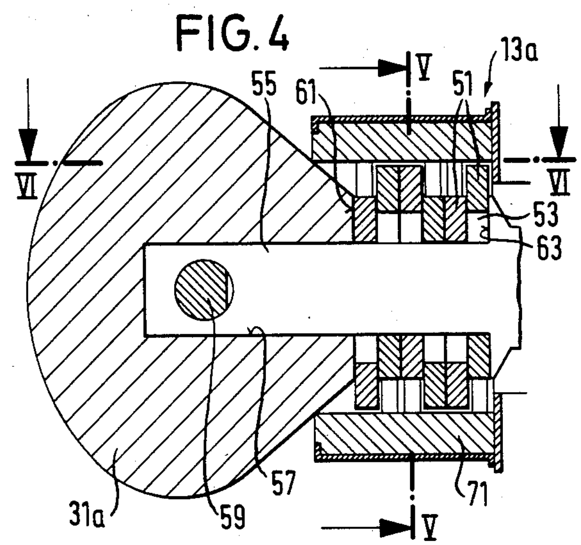
FIG. 4 shows a sectional view through the key according to FIG. 2, inserted into a lock usable in the installation according to FIG. 1.
Figure 5:
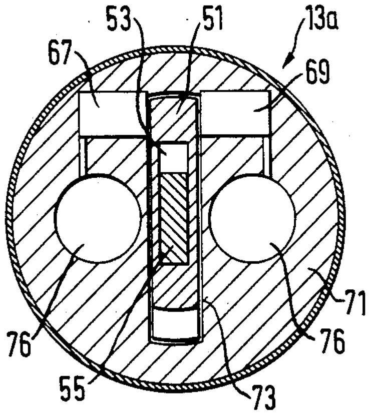
FIG. 5 shows a sectional view through the lock according to FIG. 4, seen along a line V—V.
Figure 3:
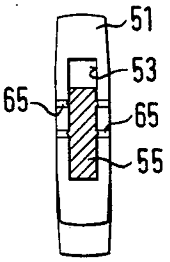
FIG. 3 shows a cross-section through the key according to FIG. 2, seen along a line III—III.
Figure 6:
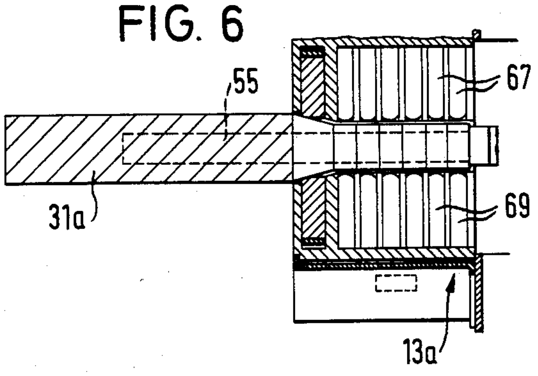
FIG. 6 shows a sectional view through the lock according to FIG. 4, seen along a line VI—VI.

FIG. 1 shows diagrammatically a block circuit diagram of a combined central locking and theft alarm installation of a motor vehicle. The central locking installation comprises a control system 1 which on supply of a trigger signal to an input 3 switches on the bolt drives, connected to outputs 5, of the door and bonnet locks of the motor vehicle in the opening direction. If a trigger signal is fed to an input 7 of the control system 1, the control system 1 switches on the bolt drive in the locking direction. The trigger signals are generated by switches 9, 11 which are coupled with a door lock 13 or its coupling linkage leading to the door locking mechanism. The lock 13 is formed as cylinder lock and is locked in a middle position by mechanical tumblers indicated at 15. The lock 13 can be unlocked and moved into an open position or a closed position in the case of a conforming mechanical key secret by means of a flat key 17 having recesses 21 and protuberances 23 cooperating with the tumblers, on its shank 19. In the opening end position the switch 9 is actuated and the control system 1 switches on the bolt drives in the opening direction. In the closure end position the switch 11 is actuated and the bolt drives are switched on in the closing direction.

The theft alarm comprises a control system 25 to which there are connected detectors 27 (not shown further) responding to interference with the motor vehicle, for example vibration indicators or the like. If the theft alarm is in operation, the control system 25 through its output 29 triggers an alarm apparatus, for example the horn of the motor vehicle, of one of the detectors 27 responds. The control system 25 is likewise connected to the switches 9 and 11 and is made live or activated through the switch 11 when the lock 13 is in the closure end position and made inoperative or deactivated through the switch 9 when the lock is in the opening end position.

In the region of the transition from its handle piece 31 to the shank 19 the key 17 contains an information carrier 33 readable electrically, magnetically or optically, and comprises at least one but preferably several manually adjustable or replaceable information carrier elements which permit operational manual variation of the key secret information of the information carrier 33. The key secret information of the information carrier 33 is read by a reading device 35 held on the lock 13 in the region of the key insertion opening and is compared in a control circuit 37 with ideal information data which are fed to the control circuit 37 from a memory circuit 39, preferably a digital memory circuit. The control circuit 37 delivers at its output 41 control signals which block and release the control systems 1 and 25. The control system 1 of the central locking installation is thus triggerable through the switches 9, 11 only when both the mechanical key secret information and the key secret information of the information carrier 33 fit the lock. In case the key secret information of the information carrier 33 does not match the ideal information data of the memory circuit 39, the alarm of the theft alarm installation will be triggered through the output 41 and the control system 25.

The record input of the memory circuit 39 is connected to the reading device 35. A write-enable input 43 of the memory circuit 39 is connected with the switch 11 which is actuated in the closure end position. The memory circuit 39 takes over the key secret information read by the reading device 35 in the closure end position and stores this information as ideal information for the subsequent comparison in the opening of the lock 13. Since the writing of the key secret information into the memory circuit 39 takes place automatically in closure of the motor vehicle door, the key secret can be deliberately altered before closure, without the necessity of additional operation of record keys or the like on the motor vehicle. The handling of the closure installation is thereby extraordinarily facilitated After the lock 13 has been coupled mechanically with the closure elements of the door or bonnet allocated to it, the door or bonnet can still be opened or closed even in the case of a defect of the central locking installation or other electronic or electrical components of the locking installation. The fact that the theft alarm may respond can be tolerated for emergency situations of this kind. In FIG. 1 only one switch lock is represented. It is also possible for several locks of this kind to be connected in parallel. Since one single key is sufficient for the controlling of all the locks, the ignition lock of the motor vehicle ca also be operated as usual with this lock.

In the circuit according to FIG. 1 a supply voltage control circuit 45 is additionally provided which is triggered on manual actuation of the switches 9, 11 and then switches on the supply voltage at least of the reading device 35, the control circuit 37 and the control system 1 of the central locking installation for a predetermined period of time. In this way the stand-by current consumption of the installation can be reduced considerably.

FIG. 1 further shows an ignition lock 46 of the motor vehicle in dot-and-dash lines. The ignition lock 46 is likewise a lock with mechanical tumblers which are locked and unlocked mechanically by the key which also locks the door lock 13. The ignition lock 46 is provided with a reading device 47 corresponding to the reading device 35 of the door lock 13. The reading device 47 is connected with the control circuit 37 and reads the key secret of the information carrier 33 when the ignition lock 46 is in the drive position. If the key secret information which is read is in conformity with the ideal information supplied from the memory circuit 39, the control circuit 37 delivers a control signal through its control signal output 41 to a gate circuit 48 which thereupon supplies to its output 50 a signal generated by a switch contact 49 in dependence upon the position of the ignition lock 46. This signal at the output 50, which is generatable exclusively by actuation of the ignition lock 46, can be utilized for the initiation of additional functions which are controllable through the variable key secret information of the information carrier 33 of the key 17. More particularly it can be provided that the keys of different users of the motor vehicle are personally coded, so that personal functions, for example preprogrammable adjusting devices for the driving seat or the external mirror of the motor vehicle, are controlled by the key 17. For this purpose the control circuit 37 can respond to several key secret information data which differ from one another completely or at least in a predetermined part. The gate circuit 48 is controlled through a line 52 in dependence upon the key secret information in each case and triggers at the output 50 the personal function allocated to the key secret information in each case.

FIGS. 2 to 6 show an optically scannable keylock system usable in an installation according to FIG. 1. Parts of like effect are here designated by the reference numerals of FIG. 1 but with the addition of the letter a. The flat key **17*a* represented in FIG. 2 carries, in the shank 19*a*, several elongated segments 51 arranged side-by-side in the longitudinal direction of the shank 19*a*. The segments 51 lie substantially in a plane common to the handle piece 31*a* and the shank 19*a* and extend transversely of the longitudinal direction of the shank 19*a*. Each of the segments 51 has a passage opening 53 through which there passes a peg 55 of rectangular cross-section protruding from the shank 19*a* towards the handle piece 31*a*. The opening 53 is wider in the longitudinal direction of the segment than the peg 55, so that the segments 51 are displaceable manually between two end positions transversely of the longitudinal direction of the shank 19*a* in the plane of the handle piece 31*a*. The handle piece 31*a* has an aperture 57 in which the peg 55 engages in shape-locking manner but axially displaceably. An eccentric peg 59 passing through the handle piece 31*a* and the peg 55 about a rotation axis transverse to the plane of the handle piece 31*a* holds the handle piece 31*a* in two positions in relation to the shank 19*a*, according to its position in rotation. In the one position the segments 51 are clamped in between an end face 61 of the handle piece 31*a* and a stop face 63 of the shank 19*a*; in the other position the segments 51 have play in relation to one another in the longitudinal direction of the shank 19*a*. As shown best in FIG. 3, the segments 51 are provided on their side faces directed towards one another with complementary detent elements 65 for their two end positions, so that in the condition clamped against one another the segments 51 cannot move and the set information of the information carrier formed by the segments 51** is maintained.

In the lock **13*a* a light barrier formed from a light-emitting diode 67 and a photo-diode 69 serving as light receiver is allocated to each segment 51. The light-emitting diodes 67 and the photo-diodes 69 are arranged in the cylinder 71, rotatable by means of the key 17*a*, of the lock 13*a* on both sides of the key passage 73 which receives the key 17*a*. In their one end position the segments 51 interrupt the ray path of the associated light barrier and in the other end position they clear it. The light barriers form a reading device for the lock secret of the key, which is settable manually by the segments 51. Axial lead passages 76 are provided in the cylinder 71 for the supply leads to the light-emitting diodes 67 and the photo-diodes 69**.

The key **17*a* is formed as a reversible key. Therefore the control circuit 37 also responds to the output signal of the photo-diodes 69** with inverted bits.

FIGS. 7 to 10 show a magnetically coded keylock system for use with the installation according to FIG. 1. Parts of like effect are designated by the same reference numerals but with the addition of the letter b.

The key **17*b* carries two substantially circular discs 75 in the region of the transition between its handle piece 31*b* and its shank 19*b* lying substantially in the same plane with the handle piece. The discs 75 are secured rotatably about an axis 77 extending perpendicularly of the plane of the discs, on opposite sides of the shank 19*b*, and their outer faces 79 facing away from one another are flush with the side faces of the handle piece 31*b*. Thus the discs 75 optically form an extension of the handle piece 31*b* towards the free end of the shank 19*b***.

The handle plate **31*b* encloses a substantially U-shaped leg spring 81 the free ends of which engage resiliently in each case in one of eight detent openings 83 distributed at equal angular intervals. The U-spring 81 is accessible through openings 85 of the handle piece 31*b* and can be compressed through the openings 85 for release of the discs 75**.

Each of the two discs 75 carries four permanent magnets 87 which are all polarized in the same direction towards the outer side of the key **17*b*. Three of the magnets 87 of each disc 75 are seated in three immediately adjacent detent positions while the fourth magnet 87 has a detent position spaced from the adjacent magnet. The magnets 87** of each disc are arranged in a detent pattern suitable for a bit coding of three-out-of-eight, and can be explored by magnetic field sensors, particularly Hall switches, which are arranged in three detent positions, directly adjacent one another.

Figure 9:
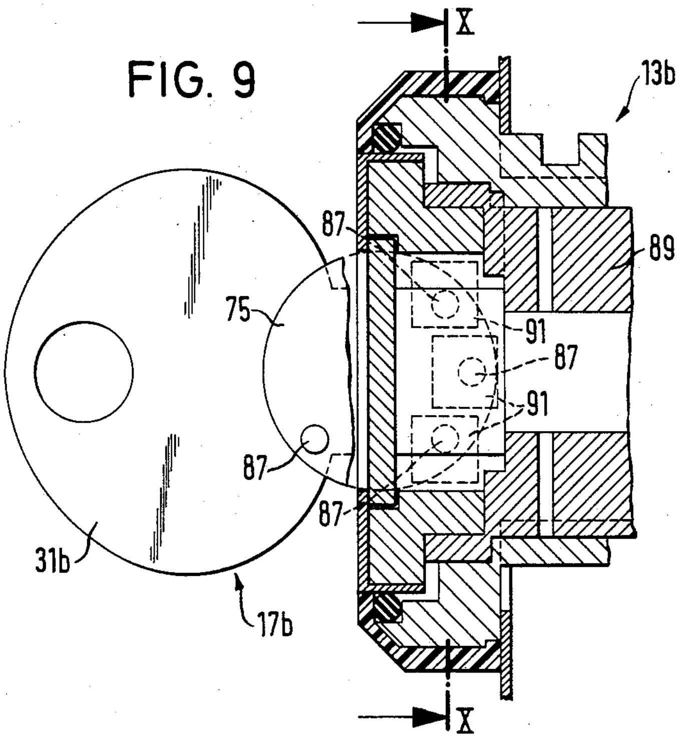
FIG. 9 shows a sectional view through a lock usable in the installation according to FIG. 1, for the exploration of a key recording to FIG. 7.
Figure 10:
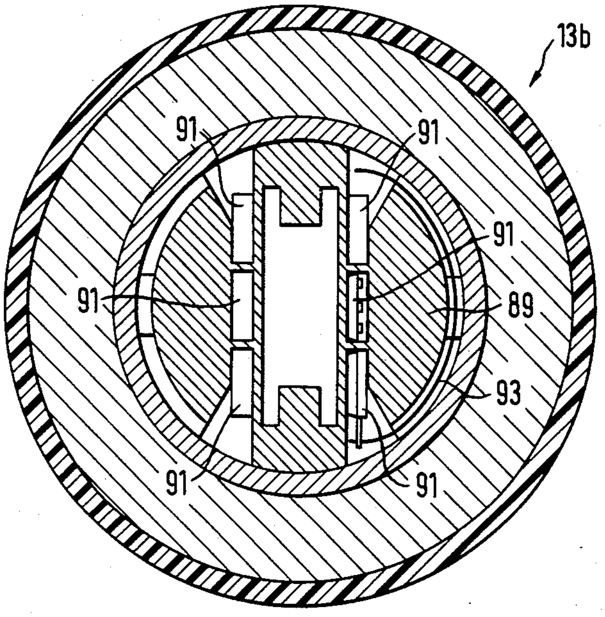
FIG. 10 shows a sectional view through the lock according to FIG. 9, seen along a line X13 X.

FIGS. 9 and 10 show a lock **13*b* suitable for the exploration of the magnet code of the key 17*b*. Three magnetic field sensors 91 are arranged on each of the two sides of the cylinder 89 of the lock 13*b* which is arranged to receive the shank 19*b* and the discs 75 and provided with tumblers (not shown further). As FIG. 10 shows, the magnetic field sensors 91 are connected through flexible leads 93** guided in passages of the cylinder 89. The key 71*b* again can be formed as a reversible key if the control system 37 of the installation according to FIG. 1 comprises a code converter circuit which converts the bits of the digital signal supplied by the magnetic field sensors, in accordance with the predetermined code pattern of the magnets 87.

Figure 7:
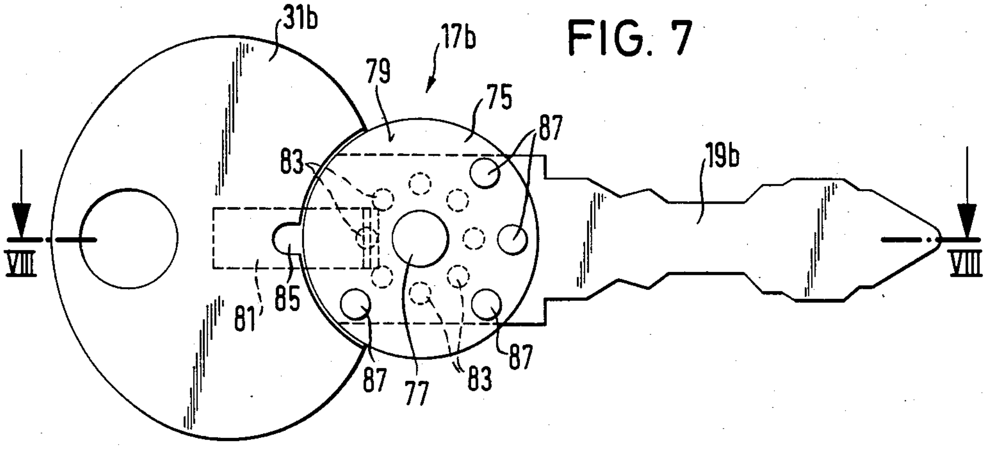
FIG. 7 shows a lateral elevation of a magnetically coded key for use in an installation according to FIG. 1.
Figure 8:
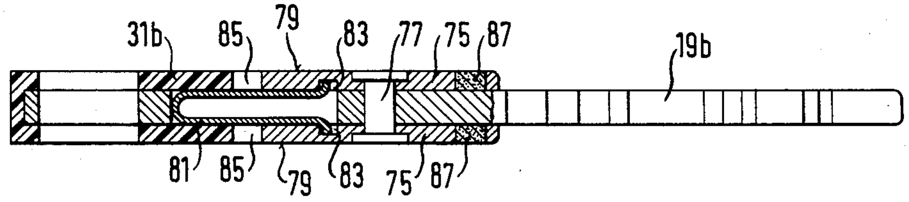
FIG. 8 shows a sectional view through the key according to FIG. 7 seen along a line VIII—VIII.
Figure 11:
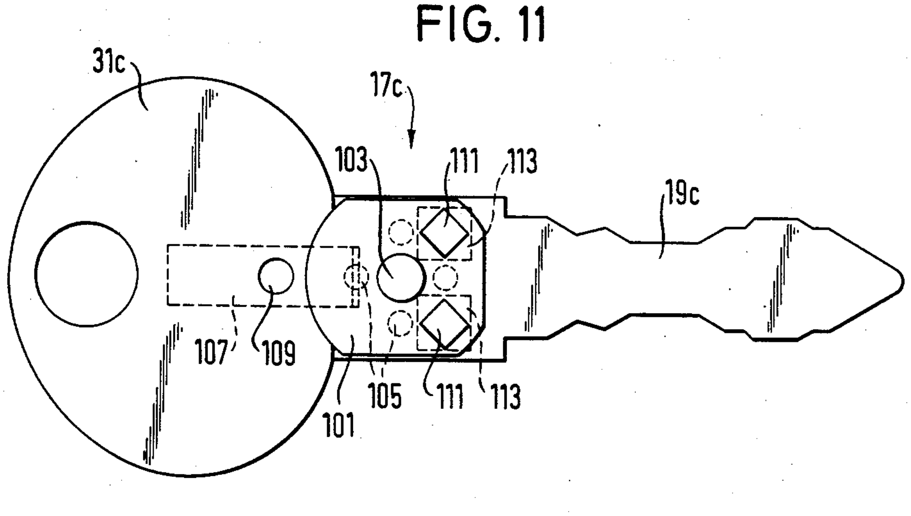
FIG. 11 shows a second embodiment of a magnetically coded key for use in an installation according to FIG. 1.

FIG. 11 shows a magnetically coded key similar to the key according to FIG. 7 for use in an installation according to FIG. 1. Like parts are designated by like reference numerals but with the addition of the letter c.

The key 17*c* carries two discs 101, only one of which is visible, on mutually opposite sides of the shank 19*c* in the region of the transition from its handle piece 31*c* to its shank 19*c* protruding substantially in the plane of the handle piece 31*c*. The discs correspond to the discs 75 according to FIGS. 7 and 8, but in contrast thereto have a substantially square form and do not protrude like the discs 75 beyond the longitudinal edge of the shank 19*b*, but terminate approximately flush with the longitudinal edge of the shank 19*c*. The external contour of the key is hardly altered in comparison with conventional keys by the discs 101.

Each of the discs 101 is mounted on the shank 19*c* rotatably about an axis 103 of rotation extending transversely of the plane of the discs and comprises four detent recesses 105 offset in angle by 90° in relation to one another in which there engage in detaining manner the free ends of a U-shaped leg spring 107. The U-spring 107 is seated in the handle piece 31c and accessible for unlocking through openings 109. Each of the two discs 101 further carries two permanent magnets 111 offset in angle by 90° in relation to one another. Magnetic field sensors indicated in chain lines at 113 and pertaining to the lock (not illustrated further) detect the manually set angle positions of the discs in a two-out-of four code. Here again the magnets 111 are in each case polarized in the same direction towards the outer side of the key.

Figure 12:
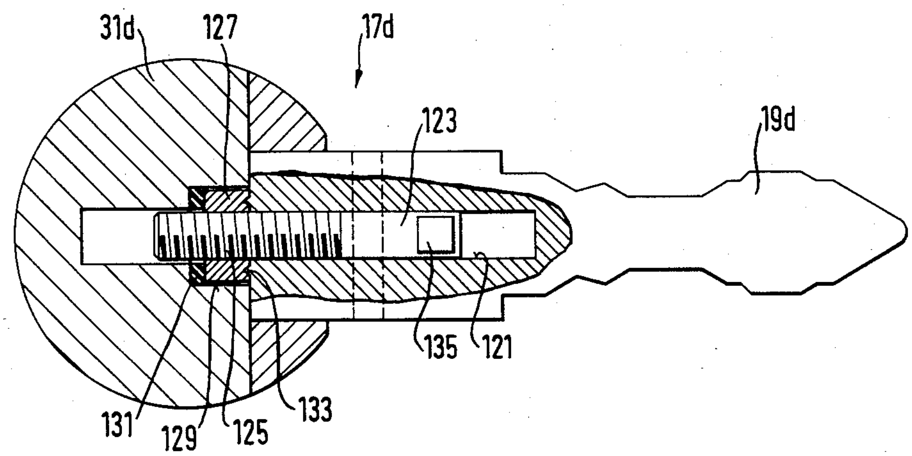
FIG. 12 shows a third embodiment of a magnetically coded key for use in an installation according to FIG. 1.
Figure 13:
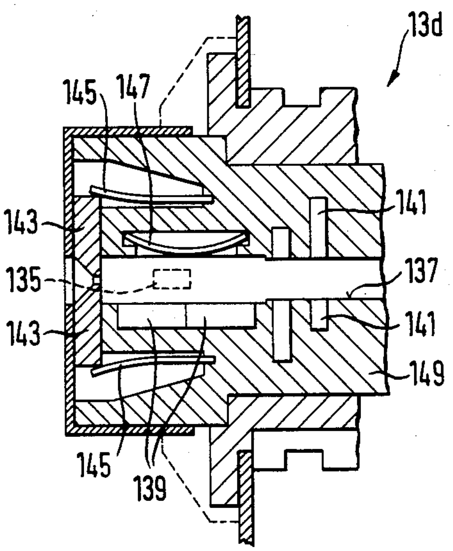
FIG. 13 shows a sectional view through a lock exploring the key according to FIG. 12.

In FIGS. 12 and 13 parts of like effect are designated with the same reference numerals as in FIG. 1 but with the addition of the letter d. FIG. 12 shows a magnetically coded key 17*d* which contains, in the region of the transition from its handle piece 31*d* to the shank 19*d* extending substantially in the plane of the handle piece 31*d*, a guide passage 121 for a pin 123 extending in the longitudinal direction of the shank 19*d*. At its end facing the handle piece 31*d* the pin 123 has an external threading 125 which is screwed, similarly to a spindle drive system, into a nut 127 accessible from outside the handle piece 31*d*. The nut 127 is seated in an aperture 129 of the handle piece 31*d* and is rotatable from the exterior. A washer 131 of rubber-elastic material seated likewise in the aperture 129 and surrounding the pin 123 stresses the nut 127 against detent elements 133 on the side of the aperture 129 axially opposite the washer 131. The detent elements 133 co-operate with complementary detent elements of the nut 127 and prevent unintended rotation of the nut 127. The detent elements 133 can be a toothing of the aperture 129 pointing axially to the nut, permitting rotation of the nut 127 in fine stages. Alternatively a radial peg can be provided on the nut 127 and engages in an axially defined aperture of the radial side edges of the aperture 129. A detent arrangement of this kind permits rotation of the nut 127 by multiples of a half or a whole rotation.

In the region of the transition from the handle piece 31*d* to the shank 19*d* the pin 123 carries a single permanent magnet 135 which can be displaced in the passage 121 according to the detent positions of the nut 127. For the scanning of the position of the magnet 135 the cylinder lock 13*d* as represented in FIG. 13 comprises, in the region of the insertion opening of its key passage 137, two magnetic field sensors 139 arranged side-by-side in the longitudinal direction of the key passage and formed particularly as Hall elements. The magnetic field sensors 139 supply analog output signals the amplitude of which is dependent in each case upon the distance of the magnet 135. The ratio of the amplitudes or the difference of the amplitudes is a measure for the position of the magnet 135 in relation to the key shank 19*b* and is utilized for the formation of the magnetically coded, variable key secret information.

FIG. 13 shows further details of the lock 13*d*. The mechanical tumblers of the lock 13*d* are indicated at 141. 143 indicates catch sliders which close the insertion opening of the key passage 137 when the key is removed and are deflected against the force of springs 145 in the insertion of the key. A spring 147 presses the key transversely of the key passage 137 towards the magnetic field sensors 139 in order to ensure a constant transverse distance. The position of the key 17*d* in the longitudinal direction of the key passage 137 is defined by the tumblers 141 which permit rotation of the cylinder 149 of the lock only when the key is completely inserted. The magnetic field sensors 139 are held on the rotatable cylinder 149.

Since the magnetic field sensors 139 deliver analog output signals the memory circuit 39 according to FIG. 1 and the control circuit 37 can also be arranged for the processing of analog signals. However digital circuit arrangements are preferred. For this purpose an analog-digital converter can be allocated to each of the magnetic field sensors and converts the analog signals delivered by the magnetic field sensors 139 into digital signals for processing in the memory circuit 39 and the control circuit 37. The memor circuit 39 can store the values of both, magnetic field sensors 139 in separate memory addresses.

Figure 14:
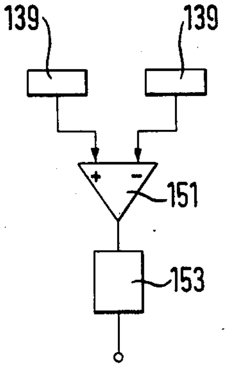
FIG. 14 shows a block circuit diagram for the conversion of the analog output signals of the reading device of the lock according to FIG. 13 into digital signals.

FIG. 14 shows a preferred embodiment in which the magnetic field sensors 139 are connected to a subtraction circuit 151, for example a difference amplifier, which delivers a signal proportional to the difference of the output signals of the magnetic field sensors 139 to an analog-digital converter 153. The memory circuit 39 and the control circuit 37 according to FIG. 1 are connected to the analog-digital converter 153. The circuit arrangement according to FIG. 14 has the advantage that only one single analog-digital converter is necessary and that only one single digital value has to be stored.

Figure 15:
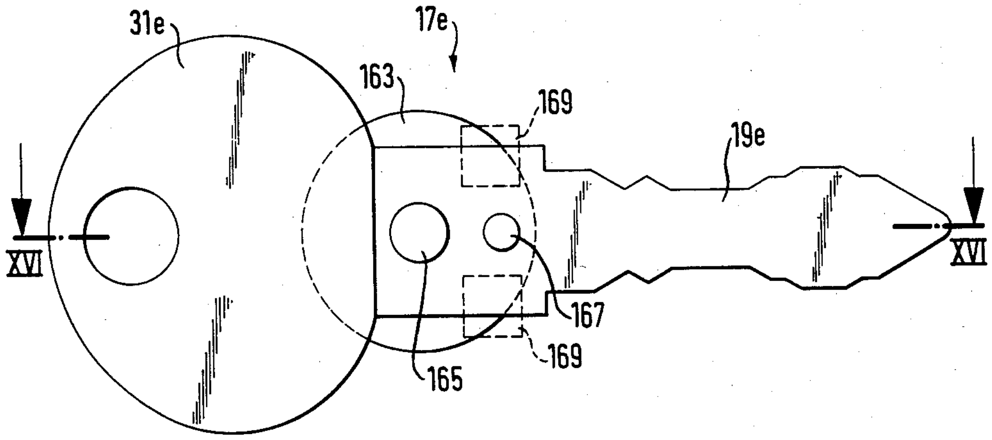
FIG. 15 shows a fourth embodiment of a magnetically coded key usable in the installation according to FIG. 1.
Figure 16:
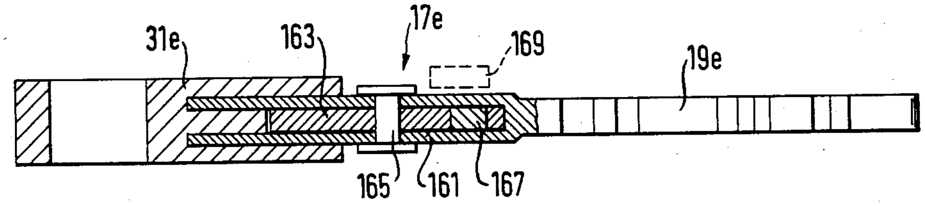
FIG. 16 shows a sectional view of the key according to FIG. 15 along a line XVI—XVI and FIG. 17 shows a fifth embodiment of a magnetically coded key for use in an installation according to FIG. 1.

FIGS. 15 and 16 show another embodiment of a magnetically coded key for a lock exploring the information in analog form similar to the lock according to FIG. 13. The key and the lock are usable in a circuit arrangement according to FIG. 1. Parts of like effect are therefore designated by the same reference numerals but with the addition of the letter e.

The key 17*e* comprises a handle piece 31*e* from which a shank 19*e* protrudes in the plane of the handle piece 31*e*. In the region of the transition to the handle piece 31*e* the shank 19e has an aperture 161 in which there is arranged a disc 163 lying substantially in the plane of the handle piece 31*e* and the shank 19*e*. The disc 163 is mounted on the shank 19*e* rotatably about an axis 165 extending transversely of the plane of the disc. The disc is accessible and rotatable from outside the aperture 161.

The disc 163 carries a single permanent magnet 167 which corresponds to the magnet 135 of the key in FIG. 12 and is explored with the aid of two magnet field sensors, particularly Hall elements, indicated at 169. The magnet field sensors 169 supply analog output signals the amplitude of which is a measure for the distance of the magnet 167 from the magnetic field sensors 169. The ratio of the amplitudes or their difference is utilized for the formation of a variable, magnetically coded key secret, as explained with reference to FIGS. 12 to 14. However in contrast to the embodiment according to FIGS. 12 to 14 the magnetic field sensors 169 are not arranged in the longitudinal direction of the shank **19*e* but spaced from one another transversely of the shank 19*e*. When the key 17*e* is inserted into the lock (not illustrated further) they are situated in the longitudinal direction of the shank 19*e* between the free end of the shank 19*e* and the axis 165**.

The disc 163 has a substantially circular form and is detained on the handle piece **31*e* in a manner not further illustrated, for example by means of a spring as explained with reference to FIGS. 7 to 11**.

Alternatively the axis 165 and thus the major part of the disc 163 can lie within the handle piece **31*e*. The disc 163** can have any desired outline form.

Figure 17:
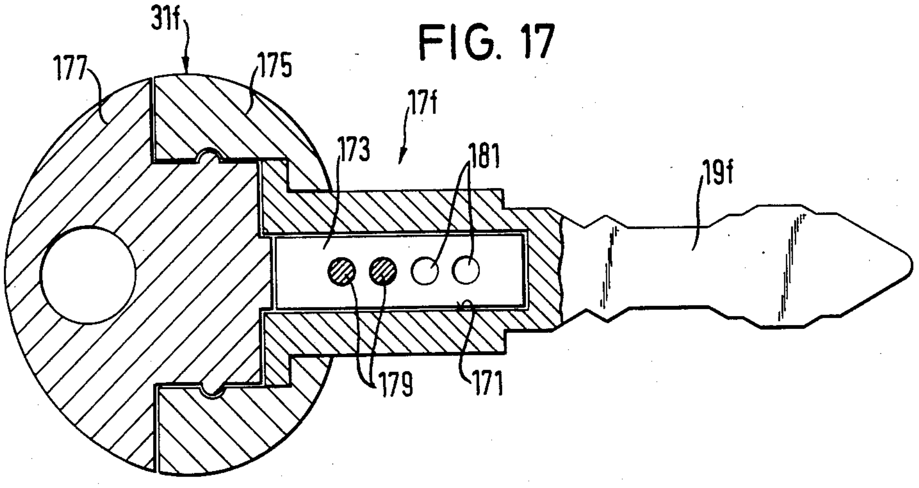

FIG. 17 shows a further embodiment of a key for an installation according to FIG. 1. Parts of like effect are designated by the same reference numerals with the addition however of the letter f. The key **17*f* again comprises a handle piece 31*f* from which there protrudes a shank 19*f* lying substantially in the plane of the handle piece 31*f*. In the region of its transition to the handle piece 31*f* the shank 19*f* contains a passage 171 which contains a strip 173 which can be removed in operation. To make possible the removal of the strip 173 the handle piece 31*f* is of divided formation and comprises a base part 175 holding the shank 19*f* and a lid part 177 held removably on the base part 175 and closing the passage 171. The strip 173 carries several permanent magnets 179 in a predetermined pattern which are inserted into apertures 181 of the strip 173 to form a magnetically coded key secret. The pertinent cylinder lock (not shown further) comprises a reading device with magnetic field sensors, particularly Hall switches, which are arranged in accordance with the pattern positions of the apertures 181 and magnets 179 and when the key 17*f* is completely inserted deliver an output signal in binary code which represents the key secret information piece of the key 17*f***.

The key **17*f* is codable in several variants. Firstly the strip 173 can be made symmetrical about at least one plane related to the pattern positions of the openings 181 and magnets 179, so that the strip 173 can be inserted into the, passage 171 in a variable position. By reversal of the strip 173, if the code pattern of the magnets 179 is not likewise symmetrical, the key secret read by the magnetic field sensors is varied. If the magnetic field sensors of the reading device can also distinguish the polarity of the magnets, a further possibility is obtained of varying the coding by reversal of the strip 173. In the configuration as explained above the magnets 170 can be held fast on the strip 173. A further possibility of variation is obtained if the magnets 179 are exchangeably seated in the apertures 181 so that the code can be varied by withdrawal and insertion of magnets into the apertures of the strip 173. In this case the strip 173** does not necessarily have to be of symmetrical configuration.

While specific embodiments of the invention have been shown and described in detail to illustrate the application of the inventive principles, it will be understood that the invention may be embodied otherwise without departing from such principles.

We claim:

1. A switch lock installation comprising:

a lock having mechanical tumblers for locking the lock in a predetermined position and providing a first key secret information, a key for mechanically unlocking the mechanical tumblers and manually moving the lock in a closure direction and in an opening direction, said key having an elongated shank and comprising on its shank, insertable into the lock, an information carrier including at least one element arranged in the carrier and forming a second key secret information, a reading device provided on the lock for reading the at least one element forming the second key secret information from the information carrier, a memory circuit for storing ideal information data of the second key secret information, a control circuit for generating a control signal in dependence upon the ideal information data stored in the memory circuit and the information read by the reading device and having a switch actuable by means of the lock and coupled with the lock, the improvement being that the information carrier comprises, for variation according to choice of the second key secret information, the at least one information carrier element which is variable positionable in relation to the shank of the key , and that the switch is actuatable on movement of the lock in the closure direction and activates the memory circuit for the writing in of the information read by the reading device as ideal information data of the second key secret information, the lock is formed as a cylinder lock and the key is formed as a flat key with a handle piece and a longitudinally extending shank protruding therefrom in the direction of a plane of the handle piece and provided with at least one or recesses and protuberances for the actuation of the tumblers of the lock, and wherein said information carrier is arranged in a region of the transition from the shank to the handle piece, the information carrier comprises at least one disc extending substantially in the direction of the plane of the handle piece, said disc being mounted on the key rotatably about an axis extending transversely of the plane of the disc and carrying at least one permanent magnet as said at least one information carrier element, and wherien the reading device comprises a plurality of magnetic field sensors for the generation of a signal representative of the position of the disc in relation to the key.

2. The switch lock installation of claim 1, wherein said at least one disc carries a plurality of the magnets staggered in relation to one another in the circumferential direction of the disc in a predetermined angle pattern, said magnets providing a code pattern in relation to a pattern in which the magnetic field sensors are arranged.

3. The switch lock installation of claim 2, wherein the at least one disc comprises eight pattern positions arranged at equal angular distances from one another and four magnets, three of which are arranged immediately adjacently and the fourth is arranged with a pattern position interspaced from the nearest magnet and the reading device comprises three magnetic field sensors, arranged in immediately adjacent pattern positions, for the at least one disc.

4. The switch lock installation of claim 2, wherein the at least one disc comprises four pattern positions arranged at equal angular distances from one another and two magnets arranged in immediately adjacent pattern positions and the reading device coprises two magnetic field ensors, arranged in immediately adjacent pattern positions, for the at least one disc.

5. The switch lock installation of claim 1, wherein the magnetic field sensors are formed as Hall switches responding to magnetic fields of predetermined polarity.

6. The switch lock installation of claim 1, wherein the at least one disc comprises a magnet and the reading device comprises two magnetic field sensors offset in relation to one another in the circumfrential direction in relation to the disc, said magnetic field sensors generating analog signals corresponding to the magnetic field intensity and the memory circuit stores the value of the two analog signals or a value dependent upon the two analog signals according to a predetermined function, as ideal information data.

7. The switch lock installation of claim 6, wherein at least one analog-digital converter is provided for the conversion of the analog signals into digital signals for supply to the memory circuit and the control circuit.

8. The switch lock installation of claim 1, wherein said at least one disc comprises two coaxially arranged discs and the reading device comprises a set of magnetic field sensors for each of the discs.

9. The switch lock installation of claim 1, wherein the at least one disc is arranged in extension of the handle piece substantially immediately adjoining the handle piece towards the shank.

10. The switch lock installation of claim 9, wherein the at least one disc has a substantially circular form, the shank has two longitudinal edges, and the circumference of the disc protrudes at least over one of two longitudinal edges of the shank.

11. The switch lock installation of claim 9, wherein the at least one disc has essentially the form of an equilateral polygon with even number or sides, the edges of a pair of said sides being approximately flush with longitudinal edges of the shank.

* * * * *